United States Patent [19]

Verduin et al.

[11] Patent Number: 4,667,802
[45] Date of Patent: May 26, 1987

[54] VIDEO JUKEBOX

[76] Inventors: Lee C. Verduin, 1855 Stilesgate SE., Grand Rapids, Mich. 49508; William C. Brotz, 4517 Chandy NE., Grand Rapids, Mich. 49505

[21] Appl. No.: 656,670

[22] Filed: Oct. 1, 1984

[51] Int. Cl.$^4$ .................. G03B 21/04; G07F 17/00
[52] U.S. Cl. .................... 194/217; 358/102; 358/903; 364/410; 369/34
[58] Field of Search .......... 194/1 N, 15, 12, 216–218; 364/400, 410; 235/381; 369/30, 34, 35; 358/102, 903

[56] References Cited

U.S. PATENT DOCUMENTS

| | | | |
|---|---|---|---|
| 3,718,906 | 2/1973 | Lightner | 194/15 X |
| 3,807,541 | 4/1974 | Kortenhaus | 194/1 N |
| 3,990,710 | 11/1976 | Hughes | 194/15 X |
| 4,527,798 | 7/1985 | Siekiershi et al. | 364/410 X |

FOREIGN PATENT DOCUMENTS 1124095  8/1968  United Kingdom .................. 194/15

Primary Examiner—F. J. Bartuska

[57] ABSTRACT

A video jukebox responsive to the deposit of money and to the actuation of a selection system for activating a phonograph to play a record for a first price and for activating that one of a pair of video tape players which is closest to a selected audio-video recording for a second price.

6 Claims, 9 Drawing Figures

VIDEO JUKEBOX

FIELD OF THE INVENTION

Our invention relates to the field of audio video entertainment and, more particularly, to a video jukebox which selectively plays any one of a plurality of purely audio recordings and combined audio and visual recordings.

BACKGROUND OF THE INVENTION

Known in the prior art for many years past are machines which, in response to the deposit of a sum in coins, play selected sound recordings. Such machines are known as "jukeboxes". More recently, combined audio and visual cassettes which present recordings by popular stars or groups accompanied by a visual presentation have become extremely popular. Suggestions have been made for the provision of apparatus which, in response to the deposit of money therein, play back such cassettes. No jukebox of which we are aware selectively plays one of a plurality of purely audio recordings and combined audio and video recordings.

SUMMARY OF THE INVENTION

One object of our invention is to provide apparatus for selectively playing one of a number of selections including strictly audio selections and combined audio-video selections.

Another object of our invention is to provide a video jukebox which provides for independent pricing of audio-video and strictly audio selections.

A further object of our invention is to provide a video jukebox comprising a central controller which distinguishes between video and audio selections.

Yet another object of our invention is to provide a video jukebox having a central controller which directly communicates with an audio record player.

An additional object of our invention is to provide a video jukebox which has a subsidiary video controller which communicates directly with the video playback system.

A still further object of our invention is to provide a video jukebox which affords relatively rapid access to a video selection.

Still another object of our invention is to provide a video jukebox which displays selected graphics at desired times when no video selection is playing.

Other and further objects of our invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
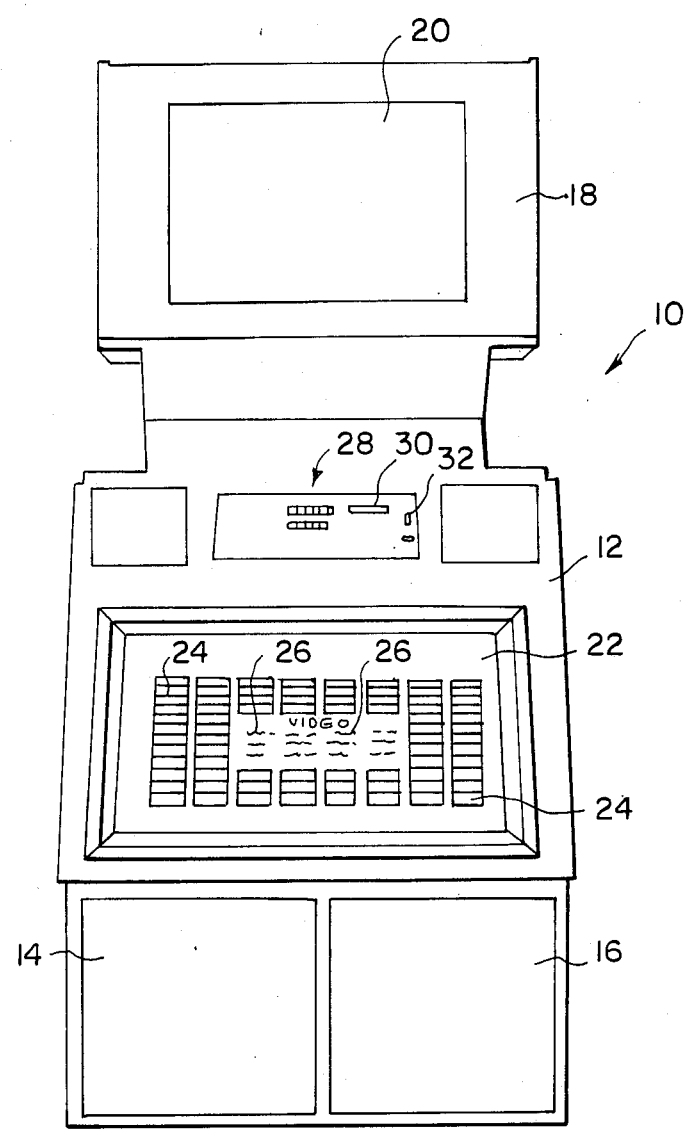
FIG. 1 is a front elevation of our video jukebox.

Referring now to FIG. 1 of the drawings, our video jukebox indicated generally by the reference character 10 includes a cabinet 12 provided with a pair of speakers 14 and 16. A video display housing 18 mounted on the top of the cabinet 12 is provided with a video screen so positioned as to be readily visible by the customer.

The front of the cabinet 12 carries a selection display panel 22 on which we mount a plurality of audio selection indicators 24. As is known in the art, such indicators may carry the title of the work as well as the artist, along side which there is placed, for example, a three digit number corresponding to the number of the selection. In our video jukebox the array of audio selection indicators 24 surrounds a central space in which there are indicated a number of audio-video selections 26 which, as known in the art, comprise a video portion which is presented for view on the screen 20 to the accompaniment of an audio output.

It is to be understood that, in the description hereinbelow, we use the term "audio selection" to indicate a purely audio playback. We use the term "video selection" to indicate both a video and audio playback.

We provide the front of the cabinet 12 with an array 28 of selection buttons on which the numbers corresponding to the desired audio and video selections may be entered into the jukebox. Cabinet 12 carries a bill acceptor of any suitable type known to the art having a mouth 30 through which a bill can be inserted into the acceptor. A coin slot 32 affords a means for introducing coins into a suitable coin register contained within the cabinet 14.

Figure 2:
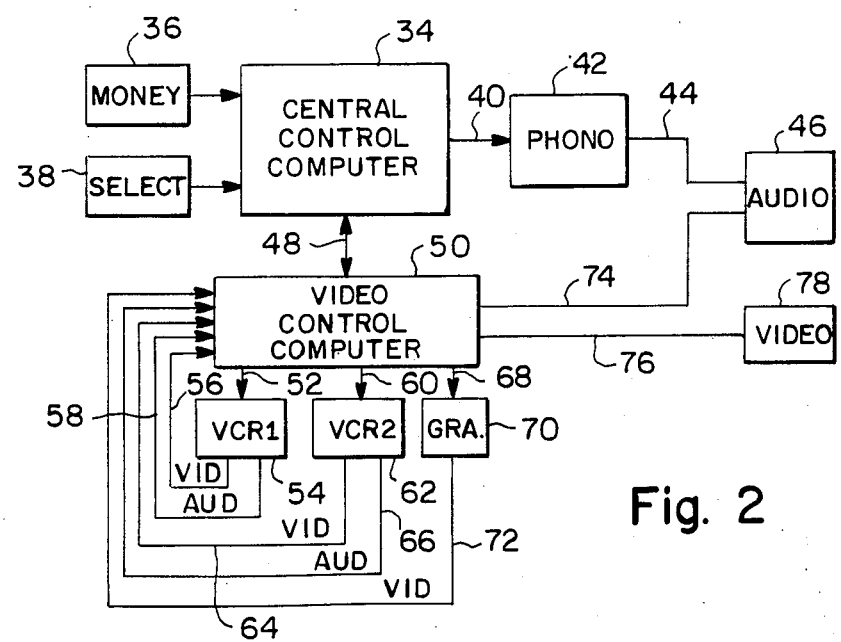
FIG. 2 is a block diagram of one form of control circuit for our video jukebox.

Referring now to FIG. 2, our video jukebox includes a central control computer which in operation of the jukebox receives a money credit input from a credit unit 36 as well as selection information from the selector unit 38. Where an audio selection has been made the computer 34 puts out a control signal on a line 40 to the phonograph 42 so that in a manner to be described the phonograph mechanism selects the correct record from the record magazine and plays the same to provide an audio signal on a line 44 which leads to the audio output 46 of the jukebox.

In the event the selection which has been made is a video selection or where certain graphics are to be displayed, the central control computer puts out a signal on a two-way channel 48 to the video controller 50 of our system. As will be apparent from the description hereinbelow, controller 34 sends data to controller 50 and receives data from controller 50 over the channel 48. As will more fully be explained hereinbelow, when a video selection has been made the controller 50 selects one of two video cassette recorders in accordance with which one of the recorders is closer to the selection to be played. In one instance the controller 50 may provide a control signal on a channel 52 to a first video cassette recorder 54 to cause that recorder to play a selection by putting out a video signal on a channel 56 and an audio signal on a channel 58. Both channels 56 and 58 feed back to the video controller 50. In the event that the other of the two video cassette recorders is to be selected controller 50 puts out a signal on a channel 60 to cause a second video cassette recorder 62 to put out a video signal on a channel 64 and an audio signal on a channel 66, both of which signals are fed back to the video computer 50.

Where the system is to display graphics, the computer 50 puts out a control signal on a channel 68 to a graphics generator 70 which in turn provides a graphics video output on a channel 72 leading back to the controller 50.

No matter which of the two video cassette recorders is activated, the audio signal produced thereby is fed by controller 50 to an output channel 74 leading to the audio output 46 of the jukebox. Similarly, no matter which of the two video cassette recorders and graphics generator 70 is activated, the resultant video signal is fed by controller 50 to a channel 76 leading to the video display 78 of the machine.

Figure 3:
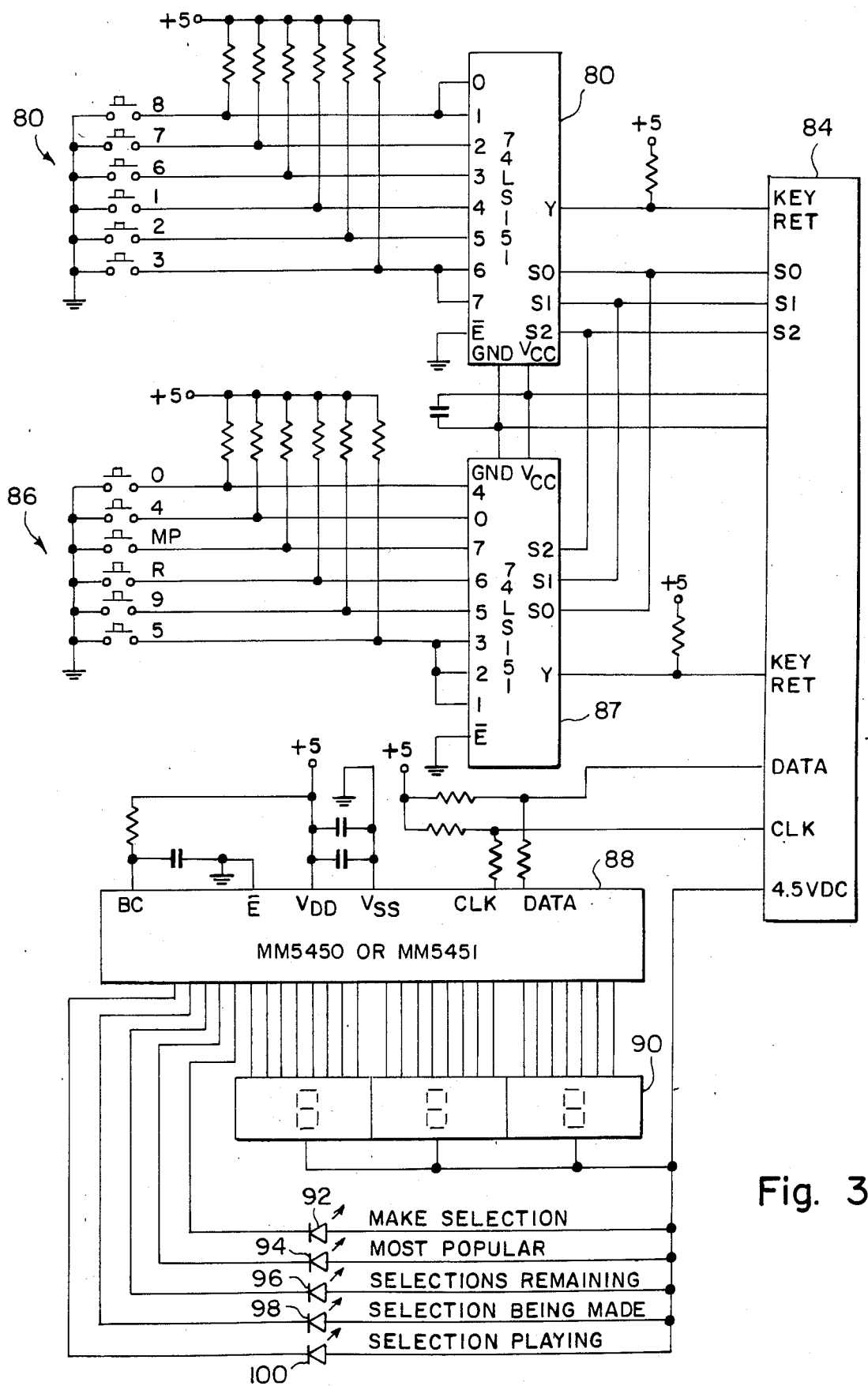
FIG. 3 is a schematic view of the selection system of our video jukebox.

Referring now to FIG. 3, the selection unit of our video jukebox includes a first group 80 of push-button switches coupled to an 8-input data selector to produce such an output at terminals S0, S1 and S2 as will indicate which button of the group has been actuated. This output is present at an output connector 84. Similarly, actuation of one of the push-buttons of the second group 86 of push-buttons acts through a second 8-input data selector to produce an output indicating which button of the group has been selected.

A display driver 88 provided with data and clock inputs from the connector 84 activates a three digit display 90 to indicate one of the available selections. Further as is required, the driver 88 may activate one of a plurality of light emitting diodes 92, 94, 96, 98 and 100 respectively to indicate "MAKE SELECTION", "MOST POPULAR", "SELECTIONS REMAINING", "SELECTIONS BEING MADE" and "SELECTION PLAYING".

Figure 4:
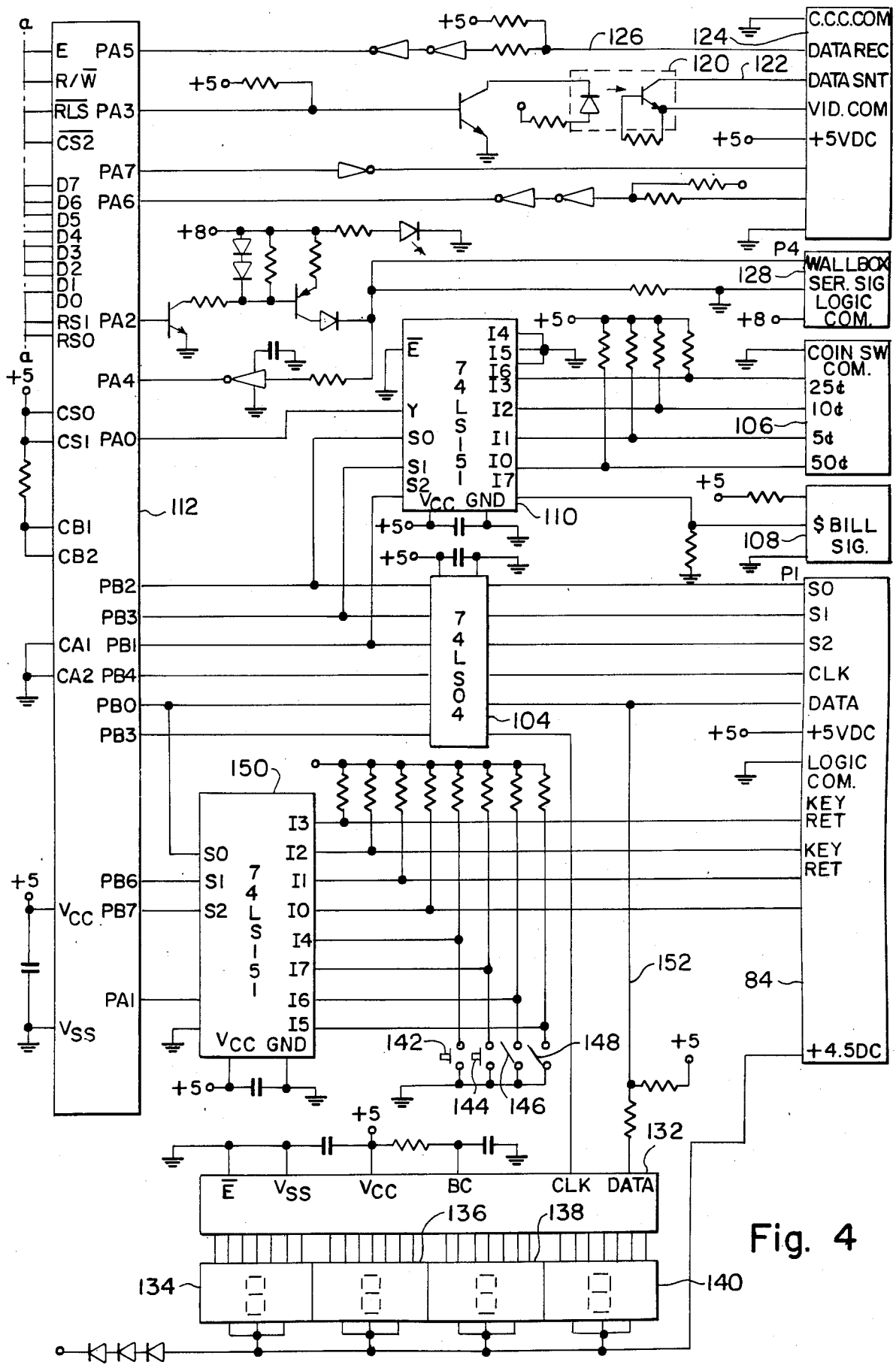
FIG. 4 is a schematic view of a first portion of the central control processor of our video jukebox.

The central controller 34 of our video jukebox includes a central microprocessor 102. The selection data connector 84 feeds the selection data to an input data decoder 104. The money input unit 36 includes a coin mechanism which provides inputs at a connector 106 leading to a decoder 110. The money unit 136 also includes a bill acceptor providing an input at a connector 108 leading to the decoder 110. We feed the outputs of both of the decoders 104 and 110 to a 16 bit input-output chip 112 which provides inputs to the microprocessor 102. For purposes of clarity, we have indicated the connections from FIG. 4 to FIG. 5 as terminating along a dot-dash line a—a.

An 8K×8 PROM 114 provides the main computer program for the main or central controller 34. A 16 bit input-output chip 115 of the central computer is coupled to a second 16 bit input-output chip 116 which provides inputs to and which receives information from the phonograph unit 42 on a channel 118. This is the operative part of our central controller when a strictly audio selection has been made by the customer. The central computer includes an optoelectric isolator 120 for providing output data on a line 122 leading to a connector 124 when video is to be played. A line 126 leading from connector 124 is adapted to receive data from the video control computer in a manner to be described.

The central control computer also leads to a wall box connector 128 to make provision for operation of the system from remote locations.

Figure 5:
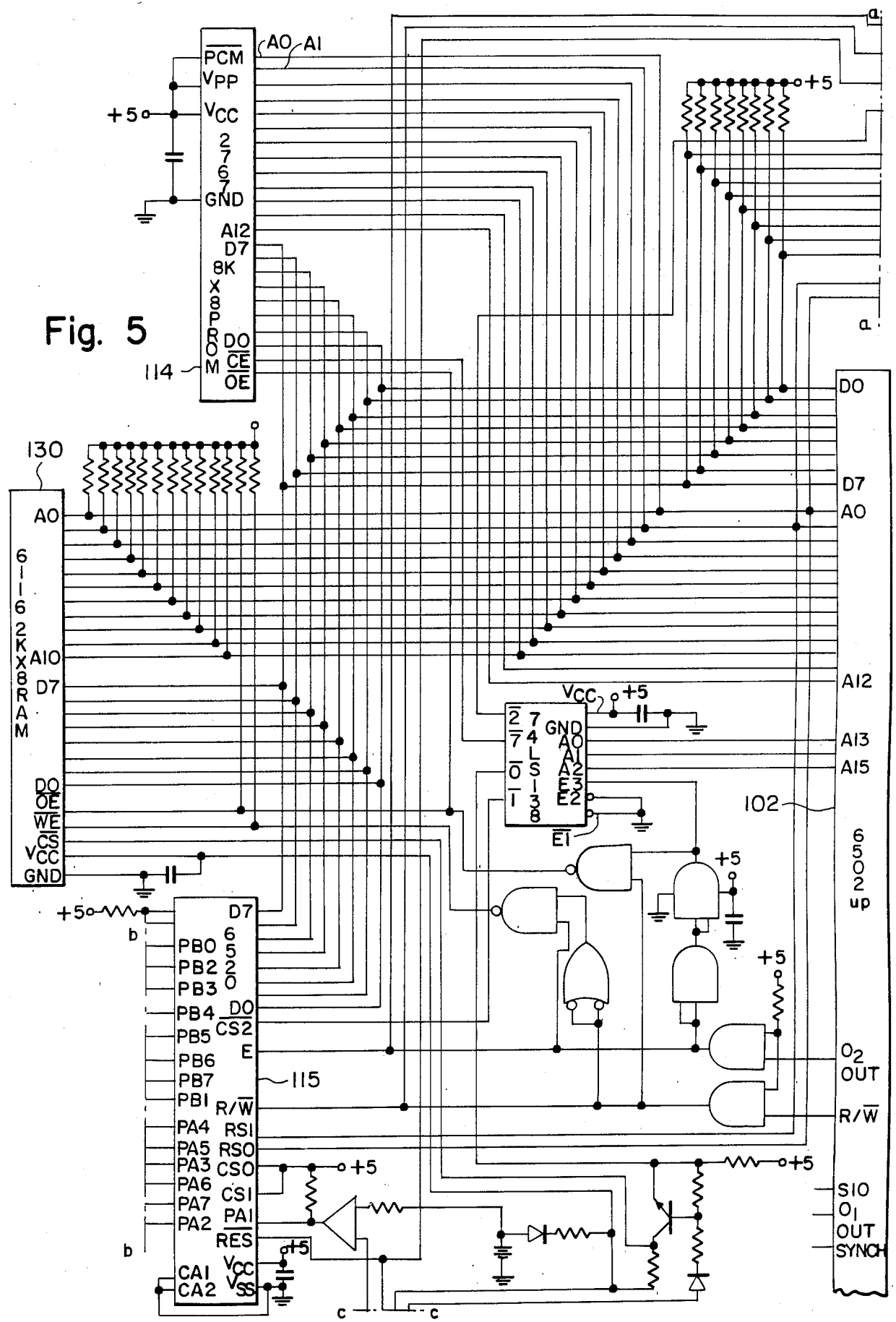
FIG. 5 is a schematic view of a further portion of the central processing unit of our video jukebox.
Figure 6:
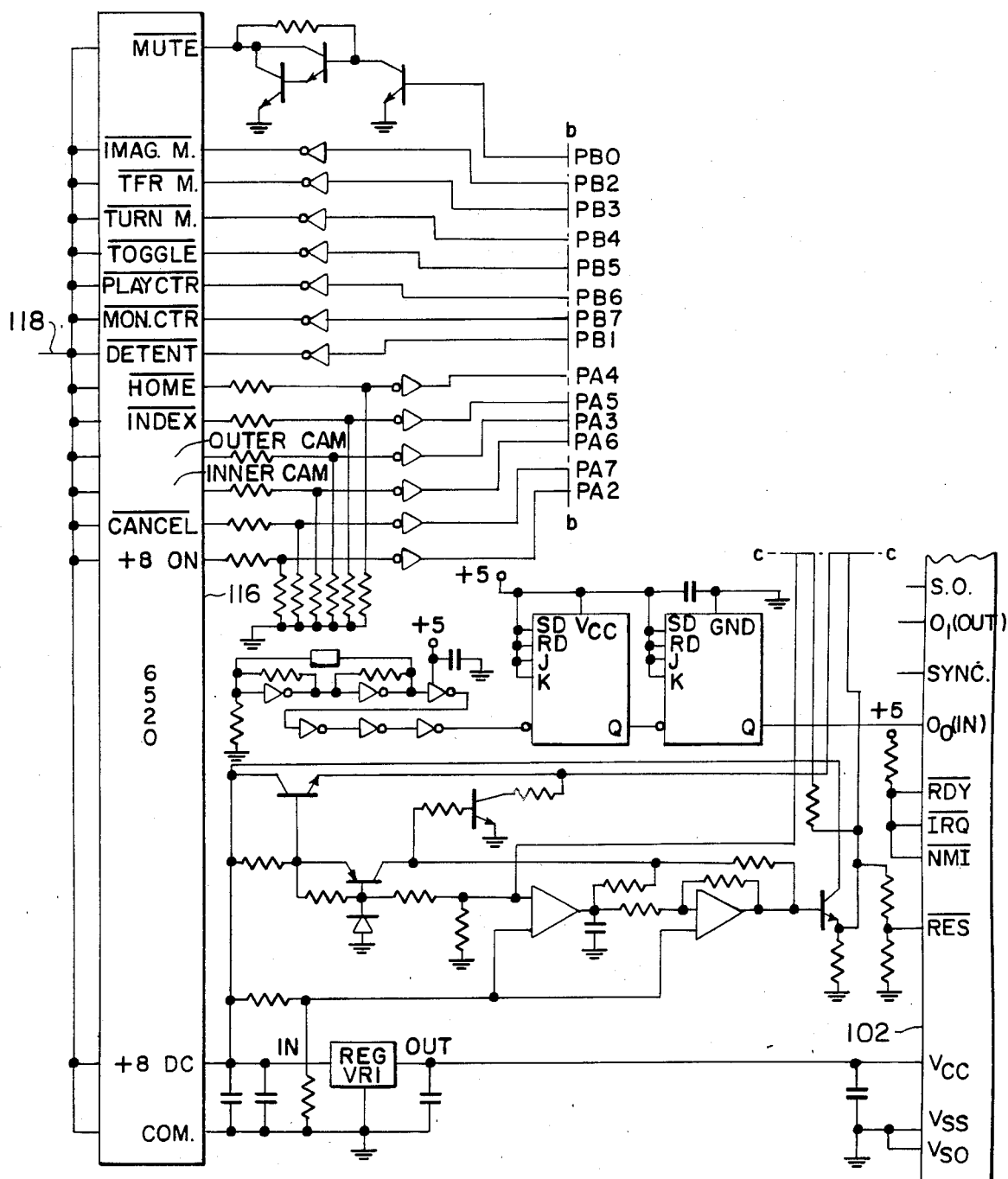
FIG. 6 is a schematic view of the final portion of the central processing unit of our video jukebox.

A RAM 130 is adapted to record useful information concerning the operation of the video jukebox. This memory includes pricing information which is programmed into the system as well as auditing information such as total number of plays, the number of times each individual selection has been played, and the like. Information stored in this computer may be fed back to a display driver 132 to activate four individual digit displays 134, 136, 138 and 140. A pair of push-buttons 142 and 144 and switches 146 and 148 may be operated to control the information which is fed back for display. By way of example, two of the digits may indicate the record number or video selection and the other two may indicate the number of times it has been played. It will readily be appreciated that this display is interior for use by the operator of the jukebox and is not intended for use by the customer. A decoder 150 responsive to the switches causes the proper data to be fed to the display driver along the line of 152. The connections between FIGS. 5 and 6 are indicated as terminating on dot-dash lines b—b and c—c.

Figure 7:
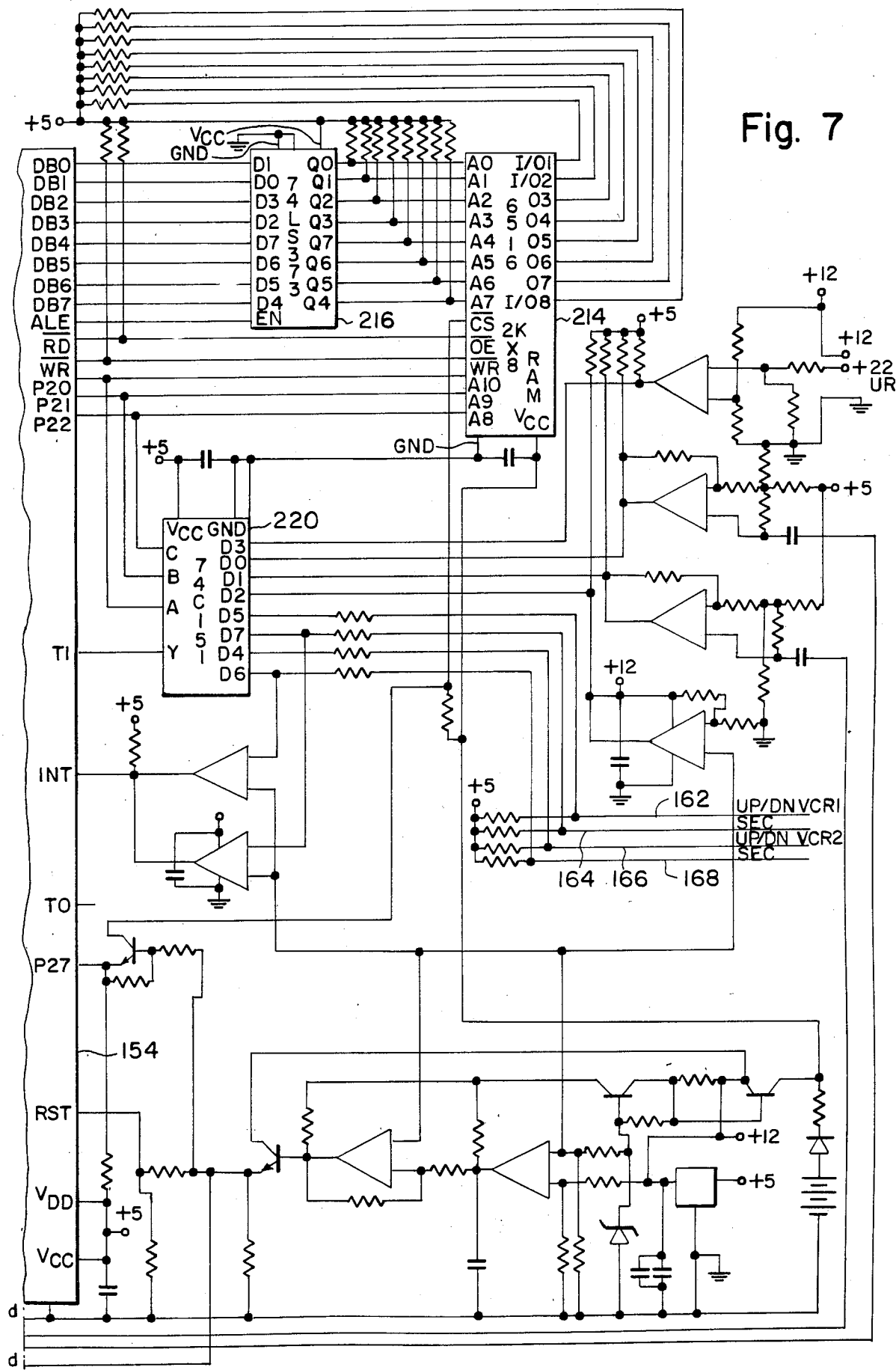
FIG. 7 is a schematic view of the video processor control unit of our video jukebox.
Figure 8:
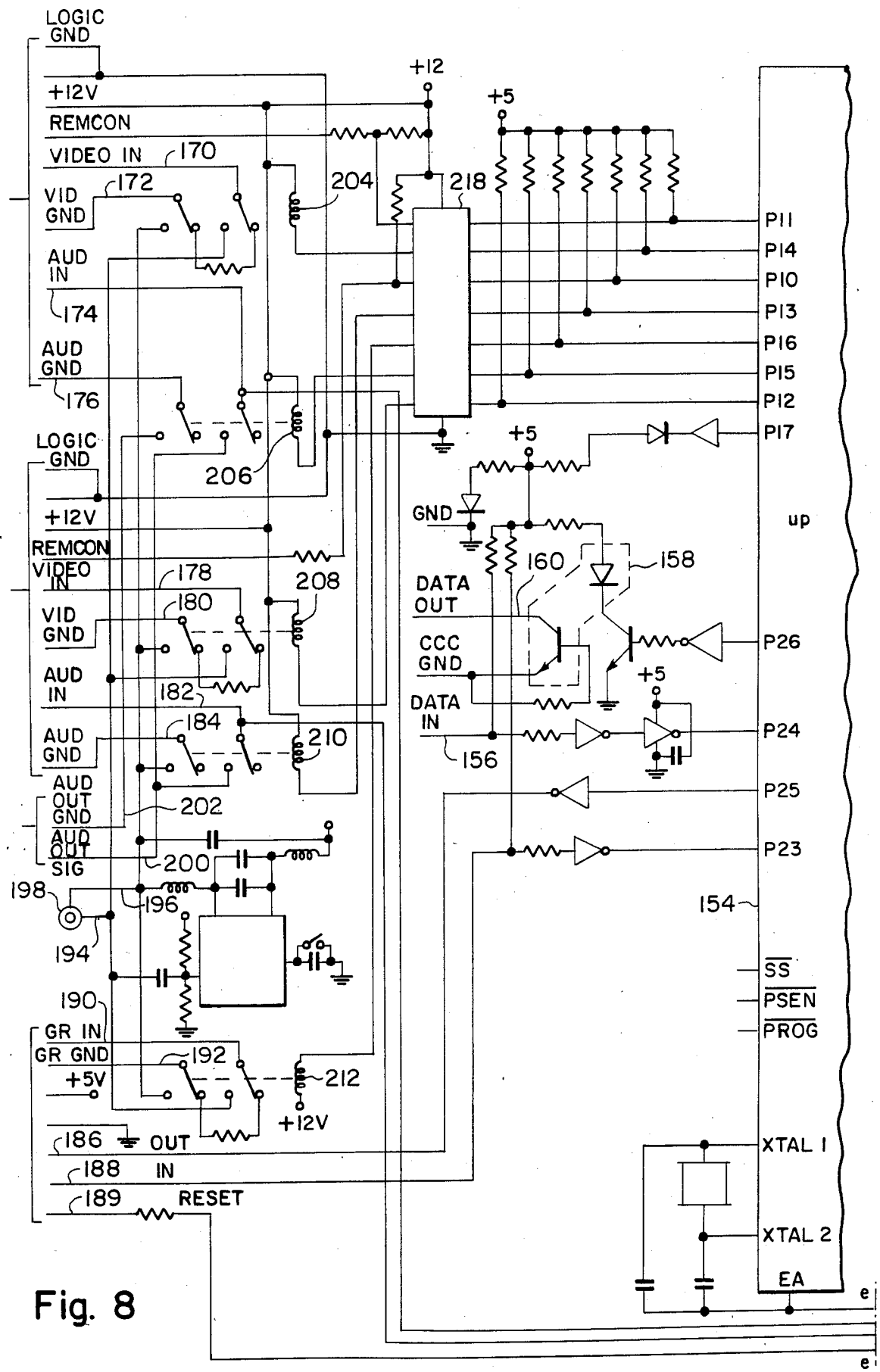
FIG. 8 is a schematic view of a further portion of the video control processor of our video jukebox.

Referring now to FIGS. 7 and 8, the video controller 50 includes a microprocessor 154 adapted to receive data input from the controller 34 on a line 156. An optoelectric isolator 158 feeds data out from controller 50 to controller 134 and a line 160. Where the VCR is to be rendered active, the computer 50 provides output data on lines 162 and 164. Where the VCR 62 is to be made active, the computer 50 provides output data on lines 166 and 168. If the VCR 54 is active it feeds the video signal back to computer 50 on lines 170 and 172 and the audio signal back on lines 174 and 176. Similarly, where the VCR 62 is active, it sends the video signal back on lines 178 and 180 and the audio back on lines 182 and 184.

Where the graphics is to come into play, controller 50 supplies data to the graphics system 70 on a line 186 and receives data back along a line 188. The system further includes a reset line 189. Where the graphic system is active it provides an input to the video controller 50 on lines 190 and 192.

The video signal output from the video controller 50 appears on lines 194 and 196 which are connected to jack 198. Similarly, the audio output signal from the video computer appears on lines 200 and 202. In order to control the application of the various video and audio inputs to the single video and single audio outputs of the controller 50, respective relay windings 204, 206, 208, 210 and 212 are properly energized. A 2K×8 RAM 214 contains the program for the video computer. The decoder 216 couples memory 214 to the computer 154 to provide those computer outputs which through a decoder 218 control energization of the relay windings in proper order to achieve the results outlined hereinabove.

A decoder 220 responsive to the microprocessor 154 provides control signal outputs for VCR 64 and VCR 62.

Figure 9:
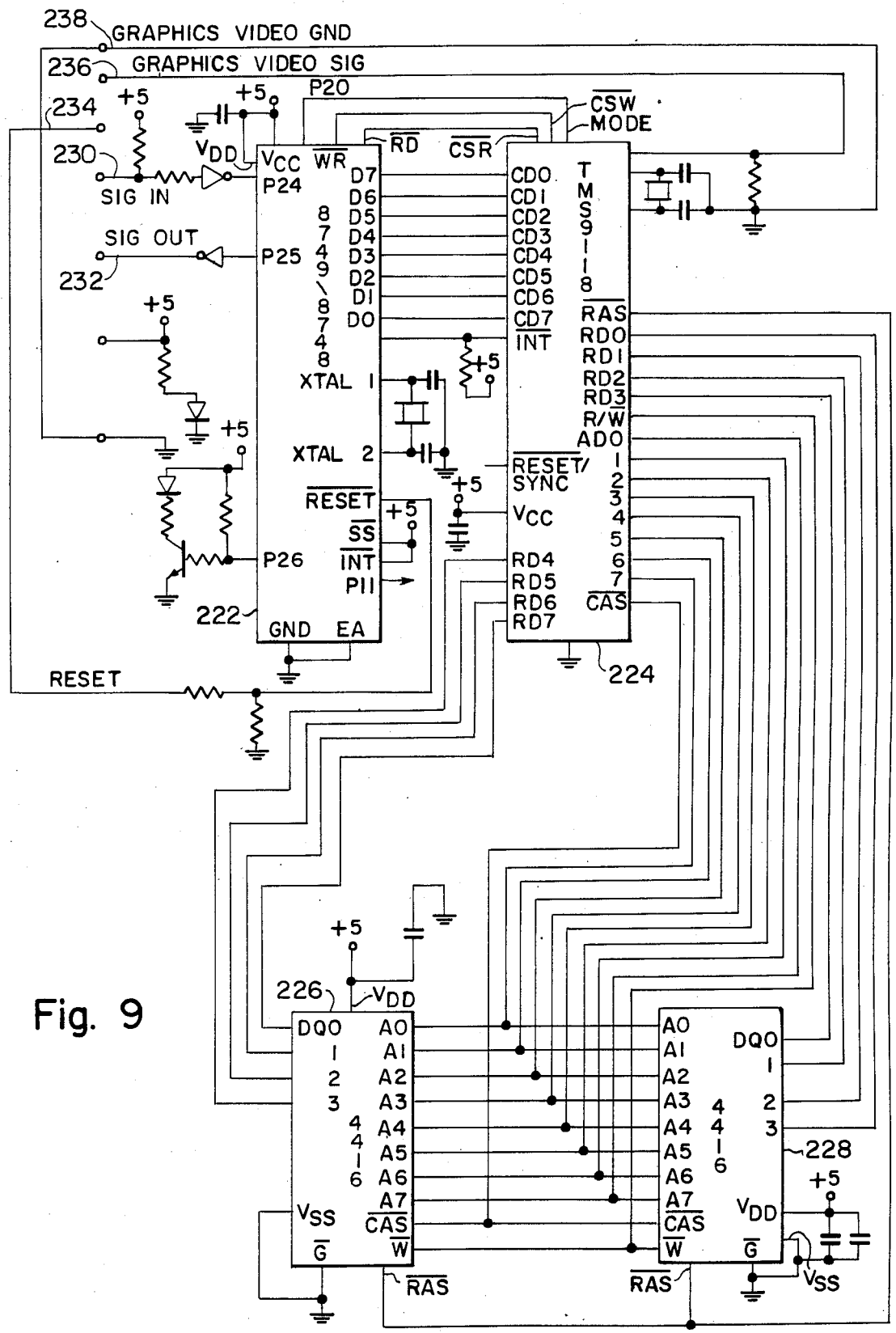
FIG. 9 is a schematic view of the video graphics generator of our video jukebox.

Referring now to FIG. 9, the graphics system 70 includes a graphics generator 222 and a video display generator 224 which, together with a pair of dynamic RAMS circuits 222 and 224 make up the graphics system. This system is adapted to receive a signal input on line 230 from the line 186 of the video computer. The graphics generator puts out a signal on a line 232 for application to the line 188 of the video computer. The reset line 234 of the graphics system is connected to the reset line 189 of the video computer. When the system is properly in operation, the display graphics, a video signal output at lines 236 and 238, is applied to lines 190 and 192 of the video computer.

In order to set up our video jukebox for operation, it is necessary to consider first the problem of access to a particular selection on the video tapes in the two video cassette recorder and playback devices 54 and 62. Normally it takes nearly four minutes to scan from one end of a video tape to another. In solving the problem of providing a reasonable access time, we first select two video recorders with identical tapes so that while you are playing one selection on one of the recorders, the other recorder can be cued up and, when the first selection is finished, the second one can start up within just a few seconds. Part of this problem is to locate the selections on the tape. In order that this be accomplished we employ recorders in which the tape is kept engaged with the reading head both in fast forward or fast reverse scan. One type of recorder which is suitable for this purpose and which we employ in our video jukebox is a Sony SL-2000. In order to enable the computer 50 to locate the selections, we place a "data dump" at the beginning of each tape. This data dump identifies the location of each of the selections on the tape. Information from this data dump is read into memory 214 during an initialization period when the tape is installed.

After the initialization in which the data dump information is loaded into the video computer memory, our jukebox is ready for operation. The customer deposits a sum of money aggregating at least the price of the selection he wishes to make. He then operates the switches of the push-button assembly 28. Upon the occurrence of these two events, the central computer 34 first makes the decision that the amount of money deposited aggregates at least the price of the selection.

If the computer 34 determines that a selection is an audio selection it provides the proper control signals from the input-output chip 116 to operate the record player 42 to cause the audio to be played on the audio system 46.

When the customer makes a video selection the central control computer feeds a signal to video control computer 50. Computer 50, with the information it has received from the two video players, computes how long it will take to locate the beginning of that selection. If that time is less than 30 seconds, for example, it will actuate the graphics generator 70 to display a message on the screen 20, such for example as "ONE MINUTE PLEASE". When it locates the beginning of the selection it just begins to play. If the computed time to locate the desired video selection is over 30 seconds, a different message will be displayed, such for example as "THANK YOU FOR YOUR SELECTION. IT WILL BE PLAYED IN A MOMENT. PLEASE ENJOY THIS MUSIC MEANWHILE." During that time computer 50 feeds back such information to computer 34 as to cause the record player 42 to play a randomly selected record. As soon as the video selection has been located the machine automatically cancels the record and begins to play the video selection.

If desired we may set up the machine so that video selections take precedence over audio selections. That is to say, if a selected audio presentation is being played, it will continue to the end. However, other audio selections which have already been made may be delayed until a later selected video presentation is played. In achieving this result, we can set up the machine so as to choose any ratio of video to audio or we can give video the preference. While, as is pointed out hereinabove by an "audio" selection, we need one which does not include a video uniquely associated therewith, we may if desired present something on the screen 20 during an audio play. For example, we might display a message such as "AN AUDIO RECORD IS BEING PLAYED. PLEASE SEE THE TITLE RACK FOR VIDEO SELECTIONS". Alternatively, we might use the audio that's being generated to create a psychodelic color display on the screen 20 which is responsive to the music and changes in time with the music analogous to the operation of the disco lamp controller for coin-operated phonograph described in U.S. Pat. No. 4,256,009, issued Mar. 17, 1981.

It will be seen that we have accomplished the objects of our invention. We have provided a video jukebox which selectively plays any selection from among a plurality of video or audio selections. Our video jukebox permits of the independent pricing of video and audio selections. It comprises a central controller which operates the record player directly and which operates the video system through a subsidiary video controller. Our video jukebox is provided with means for minimizing the time for accessing a selected video presentation.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for playing selections from among a plurality of strictly audio selections at a first price and combined audio-video selections at a second price including in combination, money responsive means for producing a credit signal in response to money deposited therein, selecting means adapted to be operated to produce respective signals identifying said selections, audio signal responsive sound producing means, video signal responsive picture presenting means, audio playback means for producing an audio signal from said strictly audio selections, first video playback means, second video playback means, each of said video playback means adapted to be actuated to produce audio and video signals from a record medium containing a series of recodings of audio-video selections, each of said video playback means having a scanning element adapted to scan its associated record medium, a first record medium associated with said first video playback, a second record medium associated with said second video playback, said first record medium and said second record medium containing the samd series of recordings of the combined-audio video selections which can be identified by said selecting means, a video controller communicating with said video playback means selectively to actuate the same and to receive information therefrom including information indicative of the locations of the combined selections, and a central controller responsive to said credit signal and to said identifying signals for actuating said audio playback means to send an audio signal to said sound producing means when said credit signal represents at least said first price and a strictly audio selection has been chosen, and for activating said video controller when said credit signal represents at least said second price and a combined selection has been chosen to actuate that video playback means whose scanning element is closest to the chosen combined selection to send an audio signal to said sound producing means and a video signal to said picture presenting means.

2. Apparatus as in claim 1 in which said video controller comprises a memory containing the location of each of said combined selections on the first and second record media.

3. Apparatus as in claim 1 in which said video controller comprises means for actuating said video playback means and means for passing audio and video signals from the actuated video playback to said sound producing means and said picture presenting means.

4. Apparatus as in claim 1 in which said video controller comprises means for computing the time for locating a combined selection and means for actuating the central controller to play a strictly audio selection when the computed time exceeds a certain time.

5. Apparatus as in claim 1 in which each of said video playback means is a video tape player.

6. Apparatus as in claim 1 including a graphics generator adapted to be activated to prooduce a strictly video output signal, said video controller activating said graphics generator at desired times to feed said strictly video signal to said picture presenting means.

* * * * *